(No Model.)
C. BAXTER.
MEANS FOR INDIVIDUALLY CONTROLLING A NUMBER OF DEVICES BY ELECTRICITY.
No. 367,332. Patented July 26, 1887.
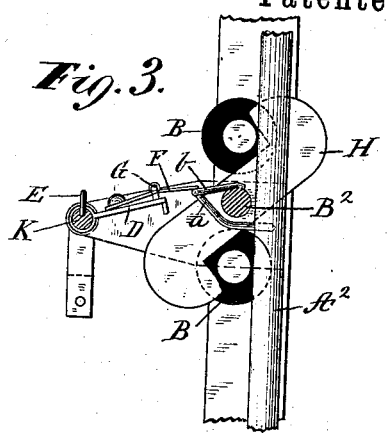
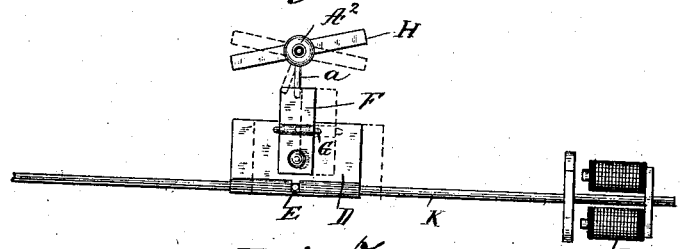
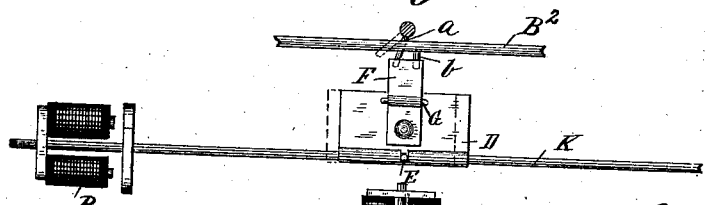
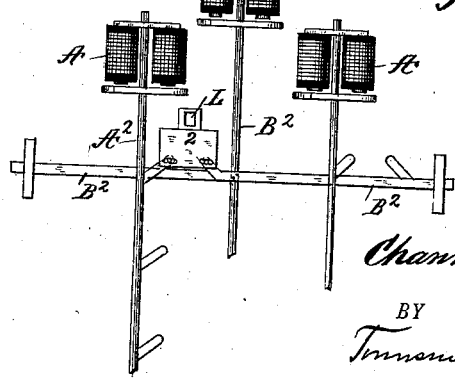
WITNESSES:
Gabriel J. W. Calister
Wm H. Capel
INVENTOR
Channing Baxter,
BY
Townsend & MacArthur
ATTORNEYS (No Model.)
C. BAXTER.
MEANS FOR INDIVIDUALLY CONTROLLING A NUMBER OF DEVICES BY ELECTRICITY.
No. 367,332.
3 Sheets—Sheet 3.
Patented July 26, 1887.
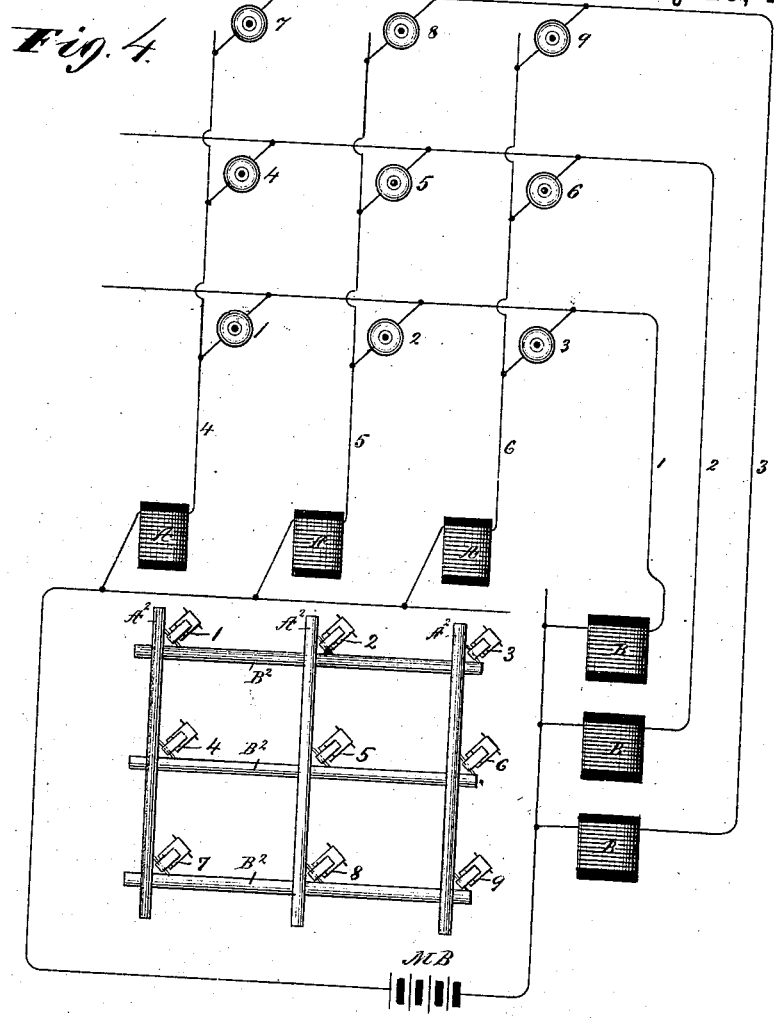
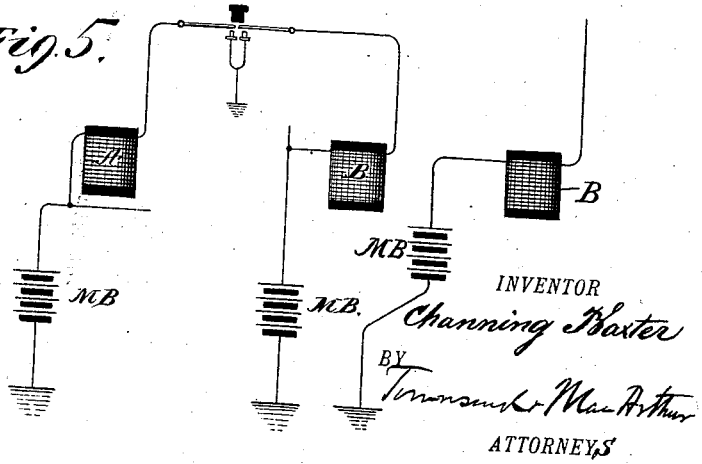
WITNESSES:
INVENTOR
Channing Baxter
BY
ATTORNEYS

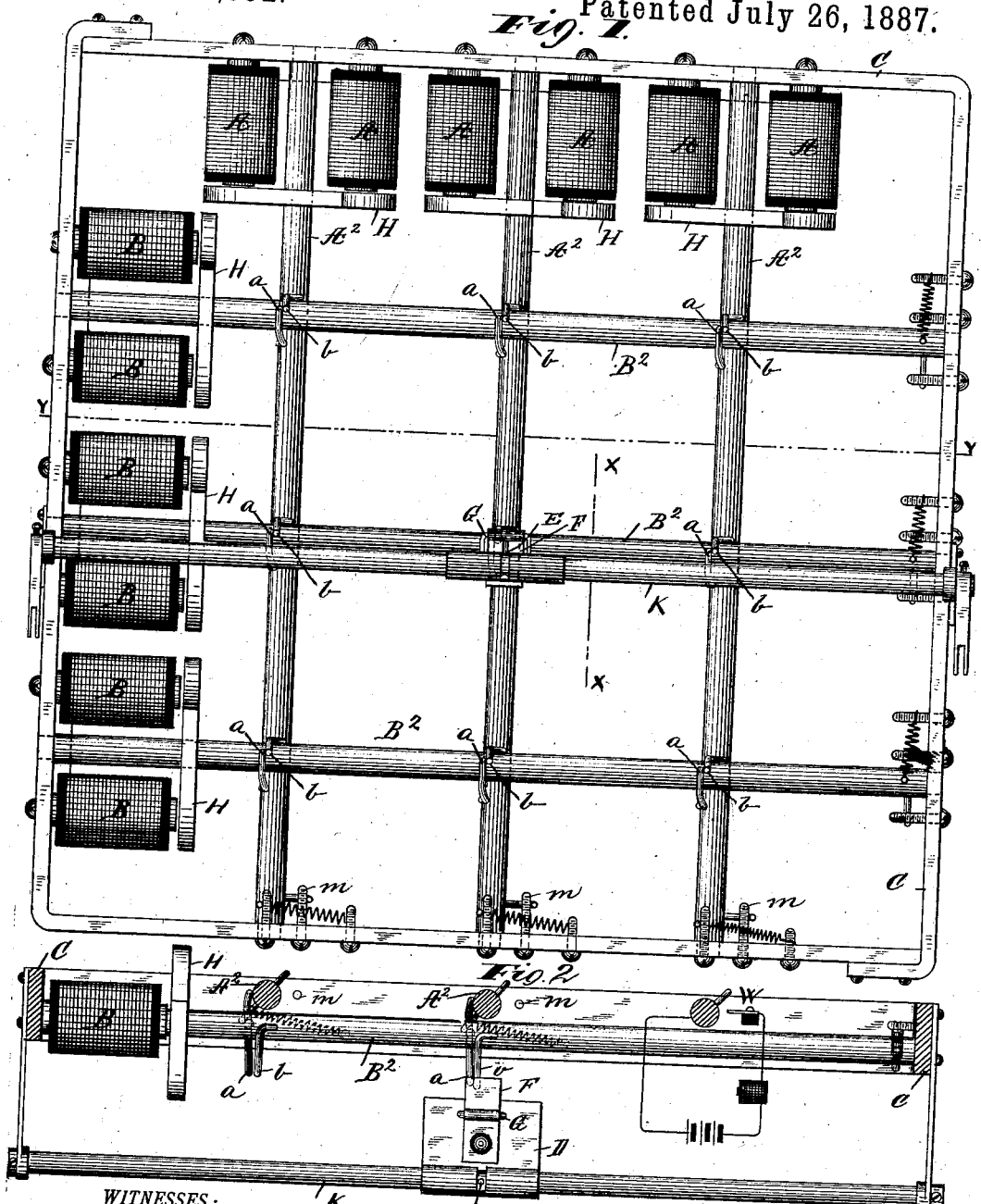

UNITED STATES PATENT OFFICE.

CHANNING BAXTER, OF BROOKLYN, NEW YORK.

MEANS FOR INDIVIDUALLY CONTROLLING A NUMBER OF DEVICES BY ELECTRICITY.

SPECIFICATION forming part of Letters Patent No. 367,332, dated July 26, 1887.

Application filed January 21, 1887. Serial No. 224,992. (No model.)

*To all whom it may concern:*

Be it known that I, CHANNING BAXTER, a citizen of the United States, and a resident of Brooklyn, in the county of Kings and State of New York, have invented certain new and useful Means for Individually Controlling or Operating a Number of Devices by Electricity, of which the following is a specification.

The object of my invention is to provide a means whereby a large number of devices may be operated or controlled by a comparatively small number of electro-magnets and circuits governed or controlled by suitable circuit-closers or similar devices acting on said circuits, so as to cause a proper operation of the magnets.

My invention is designed more particularly with reference to electric annunciators, bells, and such other devices as require to be individually controlled at a number of different points.

By the use of my invention a two-hundred-and-fifty-drop annunciator may be operated by the employment of thirty-five or less magnets and thirty-five or less leading-wires carried to the circuit-closers or push-buttons. An increasing economy in the number of magnets and wires is secured with annunciators having a larger number of drops.

My invention consists in controlling a series of devices individually by different combinations of a series of magnets in pairs, a different pair being used to control the operation of each device, and the conjoint action of the two magnets being required to effect the operation. On this principle five magnets would serve to control separately ten annunciator-drops or other devices, and by the employment of six magnets fifteen different drops could be controlled, that being the number of possible binary combinations of the six magnets. Suitable circuit-closers and circuits are employed for simultaneously bringing the magnets into action in the several different pairs or combinations.

My invention consists, preferably, in the employment of magnets arranged in two sets, and in controlling or operating each of the several annunciator-drops or other devices requiring to be controlled or operated by a pair of magnets, one from each set, the pairs employed in controlling the several annunciator-drops or other devices on the whole board or frame being different for the several drops. In combination with the two sets of magnets, two corresponding sets of leading wires or conductors are carried to the circuit-controllers or push-buttons, which latter are properly arranged to bring into simultaneous action any desired pair of circuits and magnets, the pair governed corresponding to the particular drop or other device which it is desired to actuate or control.

My invention consists, also, in certain details of construction and improved combinations of devices particularly applicable to an electric annunciator for use in hotels or other buildings. The conjoint control of the several devices by different pairs of magnets may be effected either electrically or mechanically, though I prefer to use mechanical devices on account of the greater simplicity attained. Many different devices suitable for the purpose will readily occur to skilled mechanics.

Figure 1 of the accompanying drawings is an elevation of an annunciator-frame, showing devices constructed and arranged in accordance with my invention and adapted to control nine several annunciator-drops. Fig. 2 is a horizontal cross-section on the line $y\,y$, Fig. 1. Fig. 3 is a vertical cross-section on the line $X\,X$ of Fig. 1. Fig. 4 is a diagram of circuits and apparatus illustrating the principle of my invention. Fig. 5 is a diagram of a modified arrangement of circuits. Figs. 6 and 7 illustrate equivalent means for obtaining a conjoint control of the various drops or other devices by different pairs of magnets.

In Fig. 1 of the drawings the devices for nine annunciator-drops are shown, and the magnets are divided into two sets, three in each set, thereby giving nine different pairs or combinations of magnets in the two individual sets. C indicates the frame in which the several parts of the annunciator are mounted. A A A indicate the magnets of one set, and B B B the magnets of the other set. Magnets A work on rods $A^2\,A^2\,A^2$, suitably mounted in the frame, and magnets B work on another set of rods, $B^2\,B^2\,B^2$, which latter are arranged transversely to the rods of the first set, giving nine points of intersection at which the several annunciator-drops and the devices by whose conjoint action said drops are controlled are located. The several rods are herein illustrated as rock bars or shafts mounted in suitable bearings in the frame and carrying armatures H for the magnets, which armatures, when the magnets are excited, swing into line parallel with the poles of the magnets, thereby rocking the bar against the stress of a suitable spring which tends to hold said bar against a proper stop and in position for holding the annunciator-drop up. The movement of the bar under the action of the magnet is also limited by a suitable stop, as indicated at $m$, Fig. 1. Each rod or bar $A^2$ carries a stop pin or arm, $a$, which normally rests underneath the latch E of the annunciator-drop D, sustaining said drop in a horizontal position. Each rod or bar $B^2$ carries projecting pins or arms $b$, which also normally rest in position to hold the drops up. When, however, the bars $B^2$ are rotated, the pins swing downward and are thereby disengaged from the drops. Each drop is normally held up by a pin $a$ of one rod $A^2$ in one set and a pin $b$ of a rod $B^2$ of the other set. The annunciator-drop D is of any desired construction, and is here shown as pivoted on a rod or shaft, K, properly mounted on the frame. The latch F is pivoted at G on the drop, and the stop-pins normally engage with said latch. When both pins $a$ $b$ are disengaged from the latch, and only then, the corresponding annunciator-drop swings down into a vertical plane. The latch permits the drop to be returned to normal position, the latch giving way, so as to pass the stops. The rod K forms the resetting-rod, and for this purpose carries the pin indicated at E, which engages with the drop at its hinged portion, for the purpose of raising the latter to its normal position.

When any rod $A^2$ is operated and one of the rods $B^2$ is simultaneously operated, one only of the annunciator-drops which engage with the pins on the rod $A^2$ will drop—to wit, that one which also engages with the simultaneously-operated rod $B^2$. The remaining drops will not be disengaged, because one only of the pins or detents holding them is moved, and they are therefore held from movement by the pins or detents on the rods $B^2$ that remain at rest. It will be plain, therefore, that to operate any annunciator-drop a particular pair of magnets—one in each of the two sets A B—requires to be operated. If, for instance, drop 5 is to be released, the pair formed by the two middle rods, $A^2$ $B^2$, or those which intersect opposite drop 5, must be actuated. No other drop will fall at the same time, because in the case of drops 6 and 4 they are held up by the pins of the two extreme rods $A^2$ $A^2$, while in the case of drops 2 and 8 they are held up by the pins $b$ of the upper and lower rods, $B^2$ $B^2$.

In the diagram, Fig. 4, circuit closers or controllers numbered correspondingly to the annunciator-drops are indicated. The push-buttons or circuit-controllers 1 2 3 may be on one floor of the building and the remaining buttons on floors corresponding to the horizontal lines in which they are shown arranged. From the controlling-magnets run the two sets of conductors or wires, as indicated, those from the upper magnet, B, running push-buttons on one floor and those from the other two magnets of the set running to push-buttons on corresponding floors. The conductors running from the set of magnets A run likewise to all the push-buttons of the series, as indicated, so that any pair of magnets, one in each set, each such pair corresponding to a particular annunciator-drop, may be operated.

If desired, the push-buttons may be the ordinary push-buttons now employed and connected into circuit between the several leading wires or conductors, as shown, so that if, for instance, push-button 3 be closed it will simply close the connection between leading-wires 6 1. Similarly, if push-button 8 be closed, it would close the connection between leading-wires 3 5, and so on through the various combinations of magnets in pairs, one from each set.

I prefer to arrange the operating-battery M B in the manner shown—that is to say, with its one pole connected to the magnets B, and with its other pole to the magnet A, so that the closure of any pair of circuits of the two sets will close the circuit of the battery through the desired pair of magnets. By this arrangement of the push-buttons, battery, and sets of magnets I attain the maximum simplicity. The simultaneous operation of the two magnets may, however, be produced by the employment of a compound circuit-controller and independent leading-wire circuits for the various magnets, as indicated in Fig. 5. In this case a separate battery is supposed to be employed for each magnet, and the circuit-controlling device is made in two parts, one connected to each wire of the pair requiring to be operated as indicated. In this instance a depression of the push-button or circuit-controller simply completes the circuit for each independent leading-wire to ground or to a suitable return-conductor.

An equivalent way of controlling the releasing devices by the conjoint operation of the two magnets is indicated in Fig. 6. In this case the annunciator-drop itself is made movable, in order to effect its release from the detent, (such movement of the annunciator-drop itself is made movable, in order to effect its release from the detent,) such movement of the annunciator-drop taking the place of the movement of the second of the simultaneously-operated pins $a$ $b$. The rod K, carrying said annunciator, is properly mounted so as to be longitudinally movable, and has an armature secured to it. The rod $A^2$ carries the stop-pin $a$, as before, and the movement of said rod moves the detent-stop $a$ to one side, but not far enough to disengage the drop. A further movement, however, of the drop itself with relation to the stop completes the disengagement, such further movement being produced by the operation of the magnet B, which draws the rod longitudinally, so as to carry the drop away from the detent. When the rod $A^2$ and pin *a* engaging with any particular drop are not moved, the longitudinal movement of the rod K, carrying the said drop, is not sufficient to cause disengagement. It is evident that in this form of the invention the rods K take the place of the rods B².

If desired, two pins or detents may be employed instead of the one shown in Fig. 6. This modification is illustrated in Fig. 7, where the movement of the pin *a* is sufficient to entirely disengage the drop. The second pin *b* is mounted on a fixed rod, B², and the drop is disengaged from the latter through a longitudinal movement of the supporting rod K, effected by one of the magnets B.

The conjoint control of the drops or annunciator-cards or other devices may be effected by various other mechanical devices which will readily occur to skilled mechanics. I do not, however, limit myself to any particular mechanical devices, since it is obvious that my invention may be carried out by any devices properly constructed to require a simultaneous action of the two magnets of the particular pair assigned to the particular drop or other device which it is desired to operate. Nor do I limit myself to any particular means for bringing into action the desired pair of magnets, one in each set, the essence of the invention consisting in dividing the magnets into sets connected by separate conductors with suitable circuit-controlling devices adapted to control simultaneously the desired pairs of circuits or leading-wires connected to the magnets whose conjoint action is required in order that a device may be operated.

The manner of dividing the magnets into sets will vary with the particular number of annunciator-drops or other devices which it is desired to control. In the case of a number which is the square of any whole number the largest economy would be secured by dividing the magnets into two sets having an equal number in each. In the case of other numbers it is desirable to divide them into sets, each having as large a number as possible; for instance, in the case of a five-hundred-drop annunciator the largest economy would be attained by the employment of two sets, one having twenty and the other having twenty-five magnets, since in such case but forty-five magnets and leading-wires would be required in all.

It would of course be possible to use two sets, one having ten and the other fifty magnets, since this would give the desired number of combinations of pairs; but in such case sixty magnets in all would be required instead of forty-five.

The annunciator may be constructed to cause a bell to ring whenever a tag drops by the employment of devices such as are commonly used in the art. For instance, each of the rods of one set may carry a stud or pin that shall engage with an insulated spring, as indicated in Fig. 2, when the rod is turned, said spring being connected to one pole of the alarm-bell circuit, while the frame and rod are connected to the opposite pole of the same in a way well understood in the art.

What I claim as my invention is—

1. The combination, with the two sets of electro-magnets, of the two sets of rods or bars controlled thereby and arranged with the bars of each set transverse to the bars of the other set, and annunciator drops or flaps, each having a detent mechanism under the conjoint control of a pair of rods or bars, one bar or rod from each set.

2. The combination, with the two sets of bars or rods arranged on intersecting lines, of the annunciator-drops placed at the points of intersection, and detent or stop devices for permitting the drop to fall on the simultaneous operation of the two rods or bars at whose intersection the drop is located.

3. The combination, with the two sets of intersecting rock-bars, of the drops placed at the points of intersection, and stop-pins, one on each bar, normally engaging with said drop, as and for the purpose described.

4. The combination, with a number of leading-wires, of a series of annunciator drops or indicators, each subject to the control of a single pair of releasing devices governed, respectively, by two different magnets, one magnet being in one and the other in another of the leading-wires, as and for the purpose described.

5. The combination, with the series of leading-wires and their circuit-controllers for governing the same in different combinations, of the different corresponding combinations or pairs of releasing detents or stops and electro-magnets, the latter acting each upon a single detent or stop of a pair, and a series of devices individually subject to the conjoint control of the detents or stops of a single pair or combination.

6. The combination, with a number of electro-magnets and a series of double releasing or operating mechanisms mechanically connected with each device and respectively under the control of magnets in different combinations, of a series of leading-wires and a series of circuit-closing devices for closing the circuits of corresponding combinations of wires and magnets, as and for the purpose described.

7. The combination of two sets of electro-magnets, a series of devices, each subject to the conjoint mechanical control of a single pair of magnets only, one in each set, the pair adapted to operate each device being different from that required for operating another device, two sets of conductors leading from said sets of magnets, and a series of circuit-controllers corresponding to the controlled devices and adapted to close the circuit of a corresponding pair of conductors, one in each set.

Signed at New York, in the county of New York and State of New York, this 17th day of January, A. D. 1887.

CHANNING BAXTER.

Witnesses:
WM. H. CAPEL,
GABRIEL J. W. GALSTER.